United States Patent [19]

Freed

[11] Patent Number: 6,162,845
[45] Date of Patent: Dec. 19, 2000

[54] REINFORCED CONCRETE CONTAINING ANTIMICROBIAL-ENHANCED FIBERS

[75] Inventor: W. Wayne Freed, Signal Mountain, Tenn.

[73] Assignee: Synthetic Industries, Inc., Chickamauga, Ga.

[21] Appl. No.: 08/336,529

[22] Filed: Nov. 9, 1994

Related U.S. Application Data

[63] Continuation of application No. 08/112,431, Aug. 26, 1993, abandoned.

[51] Int. Cl.$^7$ .............................. C08K 5/13; C08K 7/02
[52] U.S. Cl. ......................... 523/122; 524/5; 424/78.09; 424/404
[58] Field of Search ................. 524/5; 523/122; 424/78.09, 404

[56] References Cited

U.S. PATENT DOCUMENTS

| | | | |
|---|---|---|---|
| 3,591,395 | 7/1971 | Zonsveld et al. | 524/8 |
| 3,645,961 | 2/1972 | Goldfein | 524/5 |
| 3,959,556 | 5/1976 | Morrison | 428/364 |
| 4,111,710 | 9/1978 | Pairaudeau et al. | 106/708 |
| 4,132,556 | 1/1979 | Camprincoli et al. | 524/8 |
| 4,263,365 | 4/1981 | Burgess et al. | 428/312.4 |
| 4,343,853 | 8/1982 | Morrison | 428/233 |
| 4,407,986 | 10/1983 | Nomura et al. | 523/200 |
| 4,565,840 | 1/1986 | Kobayashi et al. | 524/8 |
| 4,611,015 | 9/1986 | Hefner, Jr. et al. | 523/408 |
| 4,769,268 | 9/1988 | Burton | 428/97 |
| 4,902,347 | 2/1990 | Soroushian et al. | 524/5 |
| 4,916,012 | 4/1990 | Sawanobori et al. | 428/367 |
| 4,960,616 | 10/1990 | Magnani | 427/186 |
| 4,961,790 | 10/1990 | Smith et al. | 106/823 |
| 4,968,561 | 11/1990 | Mizobe et al. | 428/397 |
| 5,203,629 | 4/1993 | Valle et al. | 366/2 |
| 5,224,774 | 7/1993 | Valle et al. | 366/2 |

FOREIGN PATENT DOCUMENTS 0 470 829 A1  8/1991  European Pat. Off. ........ C04B 40/00

OTHER PUBLICATIONS

Publication: "BIOKryl", Mann Industries, Inc., pp. 1–14 (undated).
Advertisement: "Four Important Reasons to Specify Master Builders Polymer Floor and Wall Systems", Master Builders, Inc., 1 page (undated).
Publication: Polycrete Fibre, pp. ../1 to ../3 and pp. 3–7 (undated).
Publication and Material Data Safety Sheet: Clintex Holdings Inc., Clinitex Corporation a Microban Products Company, (no page numbers), 12 pages, (Apr. 1993).
"A new concept—Antibacterial Agent within the Fiber" by Dorothy Swanson, *Knitting Industry*, (Aug. 1977), (no page numbers), 2 pages.

*Primary Examiner*—Terrel Morris
*Assistant Examiner*—John J. Guarriello
*Attorney, Agent, or Firm*—Renner, Kenner, Greive, Bobak, Taylor & Weber

[57] ABSTRACT

A fiber-reinforced concrete-like material product includes a plurality of fibers containing an effective amount of at least one antimicrobial agent to inhibit organisms and protect the concrete from biological attack. Preferably, the antimicrobial agents are added to the fibers prior to the fibers being dispersed in the concrete. Such a concrete product containing antimicrobial-enhanced fibers simultaneously inhibits organisms from biological attack, reduces plastic shrinkage cracking of the concrete and improve post-peak flexural strength of the concrete.

12 Claims, No Drawings

REINFORCED CONCRETE CONTAINING ANTIMICROBIAL-ENHANCED FIBERS

This application is a continuation of application Ser. No. 08/112,431, filed Aug. 26, 1993, now abandoned.

TECHNICAL FIELD

The present invention relates to reinforced concrete products and methods for producing the same. More particularly, the present invention relates to the addition of fibers to concrete and other concrete-like materials, said fibers having an effective amount of at least one antimicrobial agent incorporated therein to extend the life of the concrete. Specifically, at least one environmentally safe antimicrobial agent is incorporated into or coated onto the fibers during manufacture thereof and then the resultant antimicrobial-enhanced fibers are mixed with the concrete or other concrete-like materials so as to achieve a three-dimensional, isotropic blend. Accordingly, the fibers not only reinforce the concrete but also protect it from biological attack.

BACKGROUND OF THE INVENTION

Fibrous reinforcement of concrete through the addition of fibers to an admixture of concrete and/or other concrete-like materials has long been used in the construction industry to improve plastic shrinkage crack resistance and post-peak flexural strength. For example, Goldfein U.S. Pat. No. 3,645,961 discloses an impact resistant concrete product comprising an admixture of inorganic hydraulic cement and selected aggregate, together with a plurality of selected fibers substantially uniformly distributed throughout the admixture. Similarly, Zonsveld et al. U.S. Pat. No. 3,591,395 is directed toward products with improved bending strength made from concrete, mortar, cement or plaster of Paris and up to 2% by weight of fibrillated polypropylene film. However, few of these fibers, most of which are polymeric, steel and/or fiberglass, have included additives to further enhance performance of the fibers in the concrete. That is, most of the fibers employed are strictly used for concrete reinforcement.

There are, however, at least a few products and patents which do incorporate various additives into fibers which are then admixed with concrete or some other concrete-like material. For example, at least one product, available from Esbjerg Tovvaerksfabrik A/S of Esbjerg, Denmark under the tradename Polycrete, at least partially encapsulates calcium carbonate in polypropylene fibers which are then used for reinforcement of Portland Cement concrete. The calcium carbonate provides a chemical linkage between the fibers and the concrete matrix.

The patent literature also discloses the use of various additives in fibers for the reinforcement of concrete. This list of patents includes Valle European Patent Publication No. 0,470,829 A1, Pairaudeau et al. U.S. Pat. No. 4,111,710, Camprincoli et al. U.S Pat. No. 4,132,556, Burgress et al. U.S. Pat. No. 4,263,365, Normura et al. U.S. Pat. No. 4,407,986, Kobayashi et al. U.S. Pat. No. 4,565,840, Hefner, Jr. et al. U.S. Pat. No. 4,611,015, Soroushian et al. U.S. Pat. No. 4,902,347, Sawanobori et al. U.S. Pat. No. 4,916,012, Magnani U.S. Pat. No. 4,960,616, Smith et al. U.S. Pat. No. 4,961,790, and Mizobe et al. U.S. Pat. No. 4,968,561. However, none of these patents or publications teach or even suggest the use of an antimicrobial agent as the additive to be incorporated into the fibers.

Notably, this is the case even though antimicrobial agents have been used directly in concrete for some time to provide a more durable concrete having an increased resistance to biological attack from fungi, bacteria, mold, mildew, etc. Antimicrobial agents are also known to reduce odors and provide more hygenic environments where they are utilized. Presently, as noted in Valle U.S. Pat. No. 5,203,629, antimicrobial activity in concrete has been at least partially controlled through the use of fungicidal, germicidal and insecticidal admixtures. However, no antimicrobial agents have ever been implanted into or coated onto fibers which were then admixed in concrete. That is, none of these patents or publications suggest or make any effort whatsoever to combine (1) the implantation of at least one antimicrobial chemical agent into fibers with (2) the blending of the resultant composite fiber in an isotropic, three-dimensional manner into concrete or like materials to simultaneously effect (a) antimicrobial activity and (b) reinforcement of the concrete.

Such fiber-reinforced concrete having antimicrobial agents incorporated into the fibers themselves may serve several useful purposes. For instance, the antimicrobial agents could effectively reduce bacteria in food processing plants, hospitals, institutional kitchens, athletic locker rooms and other areas susceptible to biological attack, but where extraordinary cleanliness is required. These agents could also reduce mold and mildew which may cause discoloration and odor in slabs on grade, stucco and roofing materials in damp or wet climates. Still further, such antimicrobial agents in the fibers themselves could prevent bacteria in concrete from digesting liquid or gaseous effluent and then secreting toxic materials which attack the concrete such as, for example, sulfuric acid which has been known to attack concrete or stucco.

Thus, the need exists for a fiber-reinforced concrete having at least one antimicrobial agent incorporated in the fibers which are dispersed therein.

SUMMARY OF INVENTION

It is, therefore, an object of the present invention to provide a fiber for the reinforcement of concrete carrying at least one antimicrobial agent.

It is another object of the present invention to provide at least one antimicrobial agent within a plurality of fibers which are, in turn, dispersed within a concrete matrix.

It is still another object of the present invention to provide a fiber-reinforced concrete which exhibits improved plastic shrinkage crack resistance and post-peak flexural strength.

It is a further object of the present invention to provide antimicrobial-enhanced fibers for the reinforcement of concrete which effectively reduces the susceptibility of the concrete to biological attack.

It is yet another object of the present invention to provide antimicrobial-enhanced fibers for the reinforcement of concrete, as above, which effectively reduce odors and discoloration of the concrete.

It is still another object of the present invention to provide antimicrobial-enhanced fibers for the reinforcement of concrete, as above, which inhibits growth and contact of microorganisms such as bacteria, fungi, mold, mildew, etc. for use in areas such as food processing plants, hospitals, kitchens, locker rooms, and the like which require extraordinary cleanliness.

It is still a further object to provide a method for forming a concrete matrix having fibers dispersed therein which contain at least one antimicrobial agent.

At least one or more of the foregoing objects, together with the advantages thereof over the prior art, which shall become apparent from the specification which follows, are accomplished by the invention as hereinafter described and claimed.

In general the present invention provides a reinforced concrete-like product including concrete and a plurality of fibers, the fibers including an effective amount of at least one anti-microbial agent to inhibit organisms within and surrounding the concrete-like product.

The present invention also includes a method for inhibiting organisms within and surrounding a concrete-like product including the steps of introducing at least one antimicrobial agent to a plurality of fibers and distributing the fibers throughout the concrete during formation of the concrete-like product.

Further, the present invention provides a method for inhibiting organisms within and surrounding a concrete-like product including the step of distributing a plurality of fibers containing at least one antimicrobial agent throughout the concrete during formation of the concrete-like product.

Still further, the present invention also includes a method for simultaneously inhibiting organisms within and closely surrounding a concrete-like product, reducing plastic shrinkage cracking of the concrete-like product, and improving post-peak flexural strength of the concrete-like product, including blending a plurality of fibers containing at least one antimicrobial agent into concrete during formation of the concrete-like product.

The present invention also provides a fiber providing for use in the reinforcement of concrete at least one antimicrobial agent.

PREFERRED EMBODIMENT FOR CARRYING OUT THE INVENTION

As noted hereinabove, the present invention relates to the addition of reinforcing fibers to concrete and/or other concrete-like materials, the fibers including an effective amount of at least one antimicrobial agent to protect the concrete from biological attack by organisms such as mold, mildew, bacteria, fungi, algae, and the like. For purposes of the convenience, it will be understood that the term "concrete" as employed herein may include, but is not necessary limited to, precast products, mortar, grout, shotcrete, cast in place concrete, stucco, cementitious aggregate, asphalt concrete and the like, and mixtures thereof, all of which generally comprise hardenable concrete-like materials.

Useful fibers for practice of the present invention preferably include synthetic materials including polyolefins, such as polyethylene, polypropylene and polymethyl pentene; polyesters; nylon; acrylics; acetates; and polyvinyl chlorides and any other typical fiber-forming polymeric materials. Still other polymeric materials suitable, but less preferred, as fibers for the present invention include acrylonitrile-butadiene-styrene terpolymer (ABS), polysulphone, polybutylene terephthalate (PBT), polyurethane and latex material which might be used as concrete additives. Additionally, fiberglass fibers, carbon fibers, steel fibers and any manmade fibers having specific gravities ranging from about 0.80 to about 2.36 may also be suitable for the present invention. Notably, these fibers may be coated with the antimicrobial agents if production temperatures do not permit internal incorporation.

Amorphous polyolefins such as polyethylene, polypropylene, and polymethyl pentene are generally most preferred because these fiber-forming polymers provide spaces or "zones" which are suitable for the deposition of antimicrobial agents within the fibers. Crystalline polymers such as nylon and polyester, while capable of being used to the purposes of the present invention, generally provide less suitable environments in which to place the antimicrobial agents. Any polymeric fibers which include sufficient space or large enough "zones" to deposit the antimicrobial agents without deleteriously altering the molecular structure or physical properties of the antimicrobial agents are desirable.

Moreover, at this point, it will be understood that the term "fibers" as employed herein includes, but is not necessarily limited to, conventional monofilaments and multifilaments as well as slit film and sheets of synthetic materials which may also be fibrillated. Conventional fibers of filamentary materials are not necessarily limited to cylindrical, round or circular cross-sectional configurations, but may include all known cross-sectional configurations and shapes, e.g., rectangular, square, round, oval, hollow, triangular, and the like, which may further enhance fiber cohesion or other properties. Additionally, embossed, multi-lobal, fibrillated, collated or bonded fibers, entangled multifilaments, filaments or monofilaments and fibrids and fibrils are other practical types for concrete reinforcement provided they can be suitably dispersed into the concrete. Still further, the fiber configuration could also be stubbed, spiraled, gear crimped, saw-tooth configured, gnarled, cork-screwed or otherwise deformed to develop cohesion or other fiber/concrete matrix properties.

Slit film fibers are typically formed from films and sheets of the above-identified man-made fiber-forming polymeric materials that have been slit into thin strips. These thin strips may be further split or treated by conventional processes into fibrillated or roll embossed film constructions. The films and sheets can be cut with conventional apparatus into narrow strips having both pairs of opposed sides parallel, e.g. rectangles and parallelograms, two sides parallel, e.g., trapezoids, or no sides parallel, e.g., quadrangles and other polygonal strips. Notably, slit film fibers have lengths to widths or crossectional dimensions similar to conventional fibers. The primary difference between slit film fibers and conventional fibers is in their configuration, although both are similarly dimensioned and are employed in approximately the same amounts. Furthermore, the thin strips of slit film fibers can be deformed in various manners to develop greater cohesion and/or other properties with the concrete. As indicated hereinabove, the term fibers as employed herein may include essentially all types of fibers, and therefore, the concrete used in the present invention can be reinforced with any of these fibers.

With respect to the preferred dimensions for the fibers, useful fiber lengths can range from about 0.125 to about 4 inches (0.32 to 10 cm) with about 0.125 to about 1 inches (0.32 to 2.54 cm) being most preferred. Useful fiber diameters range between about 0.003 to about 0.1 inches (0.076 to 2.5 nmm) although broader ranges are not to be necessarily precluded inasmuch as fiber diameter varies substantially depending upon the application for which the fibers are utilized. Furthermore, the thickness of the thin strips of slit film fibers preferably range from 0.001 to 0.02 inches (0.025 to 0.047 mm) and widths may vary as is necessary to achieve the final weight of the product desired. Hence, it is customary to refer to the fiber yield, i.e., denier (determined by the weight in grams of a 9000 yard length), rather than diameter. Accordingly, useful deniers preferably range from about 2 to about 10,000. It is also noted that the fibers added to the concrete may be of the same or different grades, meaning fibers may have the same or different lengths, diameters, deniers, and/or aspect ratios, depending upon the construction of the concrete and the properties desired.

In the case of fibrids or fibrils, length and cross-sectional dimensions are variable and non-uniform. Fibrid and fibril lengths or bundle lengths of from about 0.0394 to about 0.472 inches (1 to 12 mm) are preferred, with individual fiber diameters being subject to the manufacturing process. Generally, fibrids and fibrils will range from micro-deniers of less than 0.001 to about 90 denier.

In most instances, the amount of fibers added to the concrete ranges from at least about 0.025 percent by weight up to about 5 percent by weight with about 0.1 to about 2 percent being preferred. However, it will be understood that amounts in excess of about 5 percent are not beyond the scope of this invention inasmuch as such additions are not dictated by operability but rather are more of a matter of diminishing economic returns. That is, for many types of fibers, once more than about 5 percent has been added, higher performance values are offset by economics unless specific engineering properties, i.e., increased post-peak flexural performance, are sought. In addition, such fibers are preferably added uniformly to the concrete.

Antimicrobial agents useful for practice of the present invention preferably are non-toxic and environmentally safe both during use and disposal. Most antimicrobial agents control the growth of organisms by penetrating the thin cell walls of the organism, thereby disrupting the organism's metabolic function, and ultimately killing the organism. However, non-toxic antimicrobial agents cannot successfully attack human and red-blooded animal cells, which have thick cell walls, thereby making these antimicrobial agents toxicologically safe in the dosage range indicated hereinbelow. Thus, it will be understood that the term "antimicrobial agents" includes any substance which effectively protects the fibers and the concrete from biological attack from organisms including, but not necessarily limited to, fungi, bacteria, mold, mildew, algae, and other thin-celled organisms.

An example of an antimicrobial agent suitable for use in the present invention is a phenolic-based product with an extremely low toxicity level ($LD_{50}$ of 3000–5000 mg/kg at 100%) currently available from Microban Products Company of Huntersville, N.C., under the tradename "Microban B". "Microban" is believed to be a registered trademark owned by Microban Products Company for use in conjunction with liquid/spray disinfecting, antibacterial, antifungal and deodorizing preparations. The product is EPA registered-#42182-1. More specifically, Microban B is a polymer additive engineered to provide a controlled migration to the surface of the product in which it is incorporated, providing long-term efficacy, as detailed hereinbelow. This antimicrobial agent has been incorporated into fibers for blending with concrete and like materials for the purpose of inhibiting microorganisms while simultaneously reducing plastic shrinkage cracking and improving post-peak flexural strength of the concrete.

Dosage rates for the addition of antimicrobial agents to the fibers employed in the present invention vary significantly depending upon the strength required to inhibit targeted bacteria, fungi, mold, mildew and the like and can be coordinated with the amount of fibers added to the concrete to further reduce shrinkage cracking and/or improve certain other physical properties of the concrete. Thus, an effective amount of the antimicrobial agent to protect the concrete from biological attack is required. In most instances, the effective dosage will vary from about 100 parts per million to about 10,000 parts per million by weight per weight of the fibers, though lesser or additional quantities may be used to achieve suitable efficacy. Theoretically, the addition rates for the antimicrobial agents are preferably generally between about 0.005 percent by weight and about 1 percent by weight per weight of the fibers, but it will be understood that any additions depend upon the antimicrobial objective to be achieved.

The preferred method of adding antimicrobials to the fibers is in the spinning, or extrusion, portion of the fiber-forming process. At this point, the antimicrobial materials are introduced while the fiber-forming polymers or materials are in the molten or liquid state, either from heat or chemical action. As the fibers harden, the antimicrobial agents are seated into the amorphous zones of the fiber. Less preferred, but nevertheless suitable, is topical coating of antimicrobials onto the fiber surface. Thus, it will be understood that, for the purposes of this invention, when it is indicated that the fibers "include" an effective amount of at least one antimicrobial agent, it is meant that the antimicrobial agent may either be incorporated into or coated onto the fibers.

As noted hereinabove, when the antimicrobial agents are added to the fiber while the fiber is in its molten or liquid stage, the agent lodges in an amorphous, or clear zone within the fiber as it hardens. At this point, due to a process known as "solid state migration", the antimicrobial agent migrates to the surface of the fiber until equilibrium is reached in the internal vapor pressure of the polymer. When equilibrium is reached, the migration ceases and the antimicrobial agent is available to control organisms that contact it, or are in its zone of inhibition.

If the surface of the fiber is not abraded, then no additional migration occurs, providing long-term inhibition capability. If abrasion occurs, the process repeats itself. Effective inhibition of organisms continues until all of the antimicrobial agent is exhausted. In the case of concrete, long term durability is expected within the matrix, and to a lesser degree on surfaces subject to abrasion.

In other words, by first adding the antimicrobial agent to the fibers and then mixing the fibers into the concrete by conventional means well known in the art, a three-dimensional, isotropic blend is achieved. Thus, once the fibers are distributed throughout the product, a through-and-through zone of inhibition is achieved which effectively controls or otherwise inhibits any organisms which may contact the fibers or are within their zone of inhibition. Consequently, the present invention provides antimicrobial activity and simultaneously reduces plastic shrinkage cracking and improves post-peak flexural strength of the concrete. Moreover, in view of the zones of inhibition achieved, protection against bacteria, mold, fungi and the like is available even should the concrete crack, unless, of course, there is gross contamination. Thus, it is clear that the present invention inhibits organisms which are within or surround the concrete having the fibers of the present invention.

Manufacture of the fibers of the present invention may be accomplished by conventional extrusion or spinning processes or any other manufacturing process known in the art. It is important, however, to accurately meter the amount of antimicrobial agent required depending, of course, on the organisms targeted and the results to be obtained. Accordingly, controls are typically necessary to ensure that the addition of antimicrobial agents to the fibers is accurate to control targeted microorganisms at the appropriate fiber dosage rate for the concrete or cementitious material.

It will be appreciated that distribution of the fibers in the concrete occurs prior to the hardening of the concrete, i.e., during the formation of the product. As such, the fibers may be added during mixing of the concrete as well as after pouring of the concrete prior to its hardening. In the latter instance, the fibers may be sprinkled into the concrete.

In order to demonstrate practice of the invention, and in an effort to evaluate efficacy of the invention, about 0.005 percent by weight (approximately 5000 PPM) of the phenol-based antimicrobial agent, Microban B, was added during the extrusion process to about 6 denier by 0.5 inch (1.25 cm) polypropylene fiber. More particularly, the antimicrobial agent was added at a rate of about 2.27 grams per pound of fiber. The resultant fiber extruded was then cut to its proper 0.5 inch lengths and added to an average concrete mix design at a rate of 1.0 lbs. (454 grams) per cubic yard of concrete (0.025% by weight).

After the concrete cured, the resultant treated concrete (Treated Concrete) was tested for bacterial inhibition along with conventional non-treated, fiber-reinforced concrete (Control Concrete). The results of the tests are shown in Table I hereinbelow.

TABLE I

Test for Bacterial Growth/Inhibition

| Sample I.D. | Control Concrete | Treated Concrete | Inhibition Zone for Treated Concrete |
| --- | --- | --- | --- |
| E. Coli (Gram−) | Growth | No Growth | 3 mm |
| Staph. Aureus (Gram+) | Growth | No Growth | 4 mm |
| Mixed Mold (Fungi) | Growth | No Growth | 2 mm |

As can be seen in Table I, the presence of zones of inhibition in the concrete treated with fibers having the antimicrobial agent, Microban B, incorporated therein indicated that Microban B-treated fibers could kill microorganisms within about 2 to 4 mm of the area surrounding the concrete product. Notably, inasmuch as the treated fibers were mixed isotopically throughout the concrete, the particular dosage used in this evaluation not only controlled contact microorganisms, but also had a minimum inhibition zone of 2 mm around the concrete surface for the bacteria and fungi tested. Moreover, it has been found that fibers having the antimicrobial agent can inhibit some types of microorganisms within 4 mm from the surface of the concrete-like product. Furthermore, the physical properties of the concrete including the Microban B-treated fibers were similar to and consistent with those properties of the concrete having non-treated fiber.

Thus it should be evident that the present invention is highly effective in reducing shrinkage cracking while simultaneously promoting antimicrobial activity. As previously noted, the invention is particularly suited for concrete, but is not necessarily limited thereto.

Based upon the foregoing disclosure, it should now be apparent that the use of the present invention carries out the objects set forth hereinabove. It should also to be understood that any variations evident fall within the scope of the claimed invention and thus, the selection of specific component elements can be determined without departing from the spirit of the invention herein disclosed and described. In particular, it should be apparent to those skilled in the art that a wide variety of fiber compositions and fiber designs can be employed without departing from the scope of the invention. Moreover, it should be apparent to those skilled in the art that a wide variety of antimicrobial agents may be employed in the present invention as well. Accordingly, it will be understood that, while the antimicrobial agent, Microban B, is preferred, it should not necessarily be limited thereto, as other antimicrobial agents, can be substituted therefor.

Furthermore, as noted hereinabove, other means for manufacturing the fibers can be substituted for the extrusion and spinning processing noted herein. Accordingly, the antimicrobial agents can be applied topically to the fibers or incorporated therein. Thus, the scope of the invention shall include all modifications and variations that may fall within the scope of the attached claims.

What is claimed is:

1. A method for inhibiting organisms throughout a concrete product comprising the steps of:

introducing at least one antimicrobial agent to a plurality of fibers; and subsequently distributing said fibers throughout the concrete product during formation of the concrete product, thereby uniformly dispersing said antimicrobial agent throughout said the concrete product.

2. The method, as set forth in claim 1, wherein said step of introducing includes the step of incorporating at least one antimicrobial agent into said fibers.

3. The method, as set forth in claim 2, wherein at least one antimicrobial agent is incorporated into said fibers during the fiber-forming process.

4. The method, as set forth in claim 3, wherein at least one antimicrobial agent is incorporated into said fibers while said fibers are in a molten or liquid state.

5. The method, as set forth in claim 1, wherein said step of introducing includes the step of topically coating at least one antimicrobial agent onto said fibers.

6. A method for inhibiting organisms throughout a concrete product comprising the steps of:

distributing a plurality of fibers throughout the concrete product during the formation of the concrete product, as least one antimicrobial agent being combined with said fibers prior to the distribution of said fibers throughout the concrete product and being dispersed throughout the concrete product by said fibers.

7. The method, as set forth in claim 6, wherein said step of distributing includes the step of mixing the fibers throughout the concrete product.

8. The method, as set forth in claim 6, wherein said step of distributing includes the step of sprinkling the fibers into the concrete product after pouring said concrete but prior to hardening thereof.

9. The method, as set forth in claim 6, wherein the fibers are uniformly distributed throughout the concrete product.

10. A method for simultaneously inhibiting organisms throughout and closely surrounding a concrete product, reducing plastic shrinkage cracking of the concrete product, and improving post-peak flexural strength of the concrete product comprising:

blending a plurality of fibers with concrete during formation of the concrete product, at least one antimicrobial agent being combined with said fibers prior to blending said fibers with said concrete and being dispersed throughout the concrete product by said fibers.

11. The method, as set forth in claim 10, wherein said step of blending includes the step of mixing said fibers isotropically throughout the concrete product.

12. The method, as set forth in claim 10, wherein said step of blending includes the step of sprinkling the fibers into the concrete product after pouring said concrete but prior to hardening thereof.

* * * * *